(12) United States Patent
Sawahashi et al.

(10) Patent No.: US 8,385,236 B2
(45) Date of Patent: Feb. 26, 2013

(54) MOBILE COMMUNICATIONS SYSTEM, BASE STATION APPARATUS, USER APPARATUS, AND METHOD

(75) Inventors: Mamoru Sawahashi, Yokohama (JP); Kenichi Higuchi, Saitama (JP); Nobuhiko Miki, Yokohama (JP); Motohiro Tanno, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 258 days.

(21) Appl. No.: 12/740,072

(22) PCT Filed: Oct. 31, 2008

(86) PCT No.: PCT/JP2008/069941
§ 371 (c)(1), (2), (4) Date: Jun. 21, 2010

(87) PCT Pub. No.: WO2009/057776
PCT Pub. Date: May 7, 2009

(65) Prior Publication Data
US 2010/0254287 A1    Oct. 7, 2010

(30) Foreign Application Priority Data
Nov. 2, 2007  (JP) .................. 2007-286740

(51) Int. Cl.
*H04J 3/00* (2006.01)
(52) U.S. Cl. ........................ 370/280; 370/281
(58) Field of Classification Search .......... 370/276–296, 370/330
See application file for complete search history.

(56) References Cited

U.S. PATENT DOCUMENTS

| 6,405,337 | B1 * | 6/2002 | Grohn et al. | 714/749 |
| 2003/0067899 | A9 * | 4/2003 | Chen et al. | 370/335 |
| 2006/0285558 | A1 * | 12/2006 | Dottling et al. | 370/506 |
| 2009/0052397 | A1 * | 2/2009 | Meylan | 370/331 |

FOREIGN PATENT DOCUMENTS

| CN | 1481626 A | 3/2004 |
| CN | 1784923 A | 6/2006 |
| JP | 2003-179581 A | 6/2003 |
| WO | 0235735 A2 | 5/2002 |
| WO | 2006/038066 A2 | 4/2006 |

OTHER PUBLICATIONS

Patent Abstracts of Japan, Publication No. 2003-179581, dated Jun. 27, 2003, 1 page.

(Continued)

*Primary Examiner* — Mark Rinehart
*Assistant Examiner* — Mang Yeung
(74) *Attorney, Agent, or Firm* — Osha Liang LLP

(57) ABSTRACT

A user apparatus for use in a mobile communications system is disclosed. The user apparatus includes a unit which determines, using acknowledgement information received from a communications counterpart, whether retransmission is required for a transmitted signal; and a unit which transmits, to the communications counterpart, a signal required to be retransmitted according to a round-trip delay (RTD) which is set for the user apparatus for retransmission control, wherein, the RTD of the user apparatus is arranged to be changed, when the user apparatus enters a region which uses an RTD shorter than the RTD set for the user apparatus to an integer multiple of the shorter RTD.

8 Claims, 6 Drawing Sheets

OTHER PUBLICATIONS

3GPP TSG RAN WG1 meeting #42, R1-050731, London, UK, Aug. 29-Sep. 2, 2005, Vodaphone Group, et al., "Support of operation in paired and unpaired spectrum," 2 pages.

International Search Report issued in PCT/JP2008/069941, mailed on Dec. 2, 2008, with translation, 7 pages.

Written Opinion issued in PCT/JP2008/069941, mailed on Dec. 2, 2008, 3 pages.

Chinese Office Action for Application No. 200880123437.7, mailed on Sep. 5, 2012 (21 pages).

esp@cenet Patent Abstract for Chinese Publication No. 1481626, publication date Mar. 10, 2004. (2 pages).

esp@cenet Patent Abstract for Chinese Publication No. 1784923, publication date Jun. 7, 2006. (1 page).

\* cited by examiner

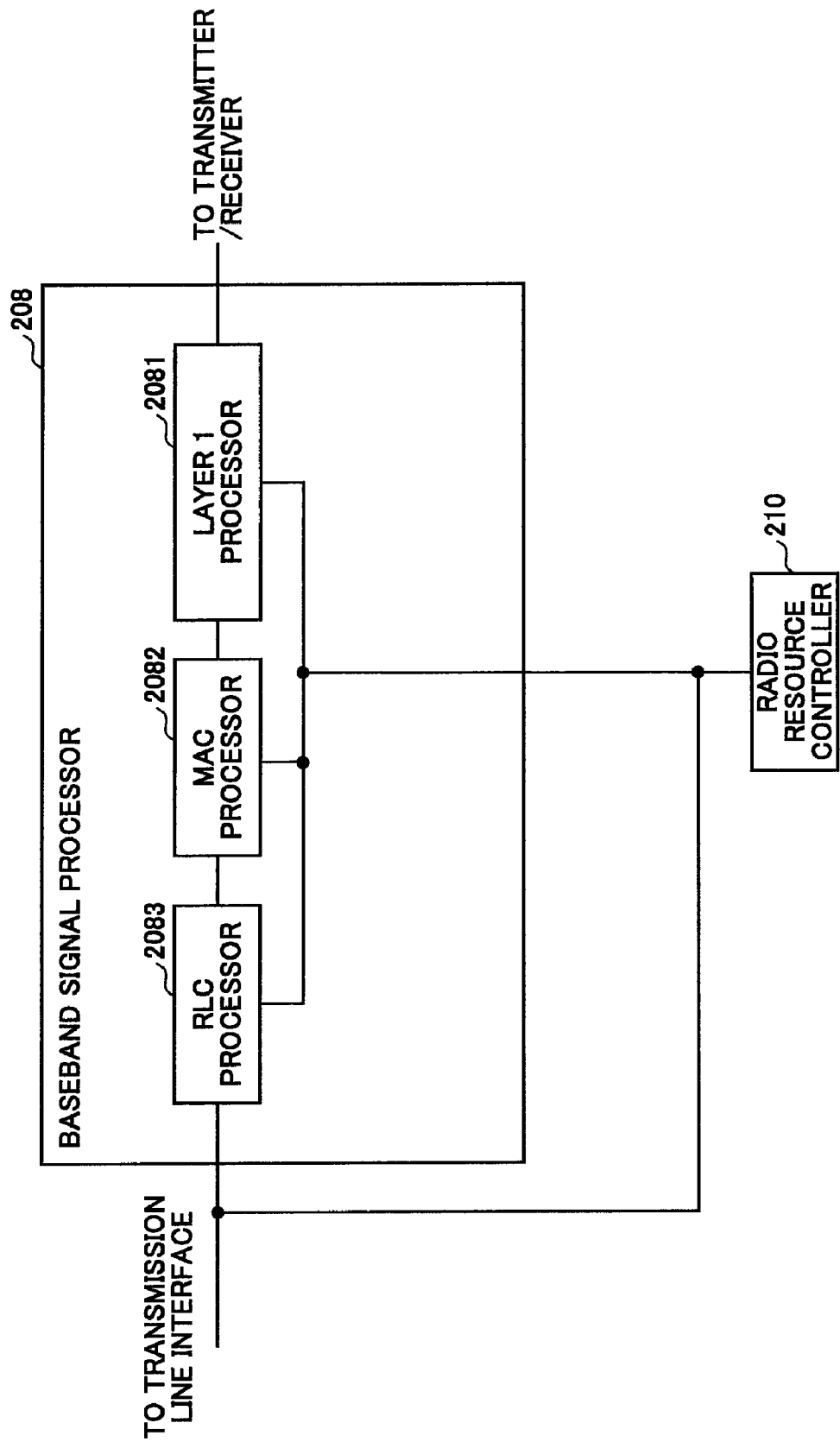

MOBILE COMMUNICATIONS SYSTEM, BASE STATION APPARATUS, USER APPARATUS, AND METHOD

BACKGROUND OF THE INVENTION

1. Field of the Invention

The present invention generally relates to the technical field of mobile communications and particularly relates to mobile communications systems, base station apparatuses, user apparatuses, and methods that perform retransmission control.

2. Description of the Related Art

In general, schemes for implementing two-way communications include a full duplex scheme and half duplex scheme. A specific example of the former scheme includes a frequency division duplexing (FDD) scheme. A specific example of the latter scheme includes a time division duplexing (TDD) scheme. The FDD scheme, which use different frequencies for uplink and downlink, respectively, makes it possible to simultaneously communicate transmit and receive signals. The TDD scheme, which uses the same frequency for uplink and downlink, has uplink and downlink periods alternating. Currently, these schemes differ from country to country and/or from region to region.

As globalization moves forward, roaming between regions of different two-way communications schemes is also in the process of being performed. Roaming may be supported with relative ease when an FDD terminal being used in an FDD system enters a TDD region. This is because a transition from the full duplex scheme to the half duplex scheme is relatively easy.

On the other hand, immediate support for roaming when a TDD terminal being used in a TDD system enters the FDD system is impossible. This is because the TDD terminal cannot tune to two frequencies simultaneously to process signals in uplink and downlink separately. In this case, similar to the FDD terminal, it is possible to provide the TDD terminal with a duplexer and to arrange for uplink and downlink to process signals separately for uplink and downlink. However, such a method may cause the TDD terminal to become extremely expensive. From such a point of view, it is being considered to change a tuning frequency between TDD terminal uplink and downlink periods, and make the TDD terminal conduct half duplex communications as before, even within an FDD system. In this way, while benefits of full duplex communications may not be obtained, roaming of the TDD terminal to the FDD system may be supported in an easy and inexpensive manner. For example, Non-patent document 1 discloses conducting half-duplex communications while changing frequencies in the FDD system.

Non-patent document 1: 3GPP, R1-050731, Vodafone Group, T-Mobile International, TeliaSonera, Telefonica, "Support of operation in paired and unpaired spectrum"

SUMMARY OF THE INVENTION

Problem(s) to be Solved by the Invention

On the other hand, in a mobile communications system in which an automatic repeat request (ARQ) is made, a round trip delay (RTD) should be set short in order to improve throughput. In general, the RTD represents a period from when a certain packet is transmitted, when a negative acknowledgement (NACK) is returned from a communications counterpart, to when the packet is retransmitted.

As described above, in the FDD system, communications uplink and downlink are done independently, so that a retransmission packet may be transmitted whenever it is ready to be transmitted. Thus, the RTD may be set short. On the other hand, the uplink and downlink periods only occur alternately in the TDD system, so that it may be necessary to wait for a transmittable period even if the retransmission packet is ready to be transmitted. Thus, the RTD tends to be set longer in the TDD system. As an example, the RTD in the FDD is set to 6 TTIs, while the RTD in the TDD is set to be 10 TTIs. The TTI, which is a transmission time interval or a sub-frame, is typically 1 ms, but may be a different value.

When the TDD terminal roams to the FDD system, one method of properly supporting an ARQ (a hybrid ARQ (HARQ), in particular) is also to make a TDD terminal operate at RTD=6 TTIs in the FDD system. However, this method leads to a need to prepare separately, for all of the TDD terminals, a function which may be processed at such a high speed that the TDD terminal may operate even in RTD=6 TTIs, leading to an increased cost.

The problem to be solved by the present invention is to make it possible for a user apparatus to be continually used easily and at low cost even when the user apparatus enters an area using an RTD which is shorter than an RTD being set for the user apparatus.

Means for Solving the Problem

In the present invention, a mobile communications system having a base station apparatus and a user apparatus is used. The base station apparatus includes a unit which determines whether retransmission is required for a signal received from the user apparatus; and a unit which, when the retransmission from the user apparatus is required, allocates a radio resource to the user apparatus such that the user apparatus may conduct retransmission according to a round trip delay (RTD) which is set for the user apparatus. The user apparatus includes a unit which determines, using acknowledgement information received from the base station apparatus, whether retransmission is required for a transmitted signal; and a unit which transmits, to the base station apparatus, a signal required for retransmission according to an RTD which is set for retransmission control. If the RTD which has been set for the user apparatus prior to the user apparatus entering a region of the mobile communications system is longer than a system RTD for use in the mobile communications system, an RTD of the user apparatus is set to be an integer multiple of the system RTD. A radio resource is allocated to the user apparatus such that the user apparatus retransmits a signal with an RTD which is the integer multiple of the system RTD.

Advantage of the Invention

The present invention makes it possible for a user apparatus to be continually used easily and at low cost even when the user apparatus enters a region which uses an RTD shorter than an RTD being set for the user apparatus.

BRIEF DESCRIPTION OF THE DRAWINGS

FIG. 7 is a partial block diagram of a base station apparatus used in an embodiment of the present invention.

DESCRIPTION OF THE PREFERRED EMBODIMENTS

Description of Notations

Figure 1:
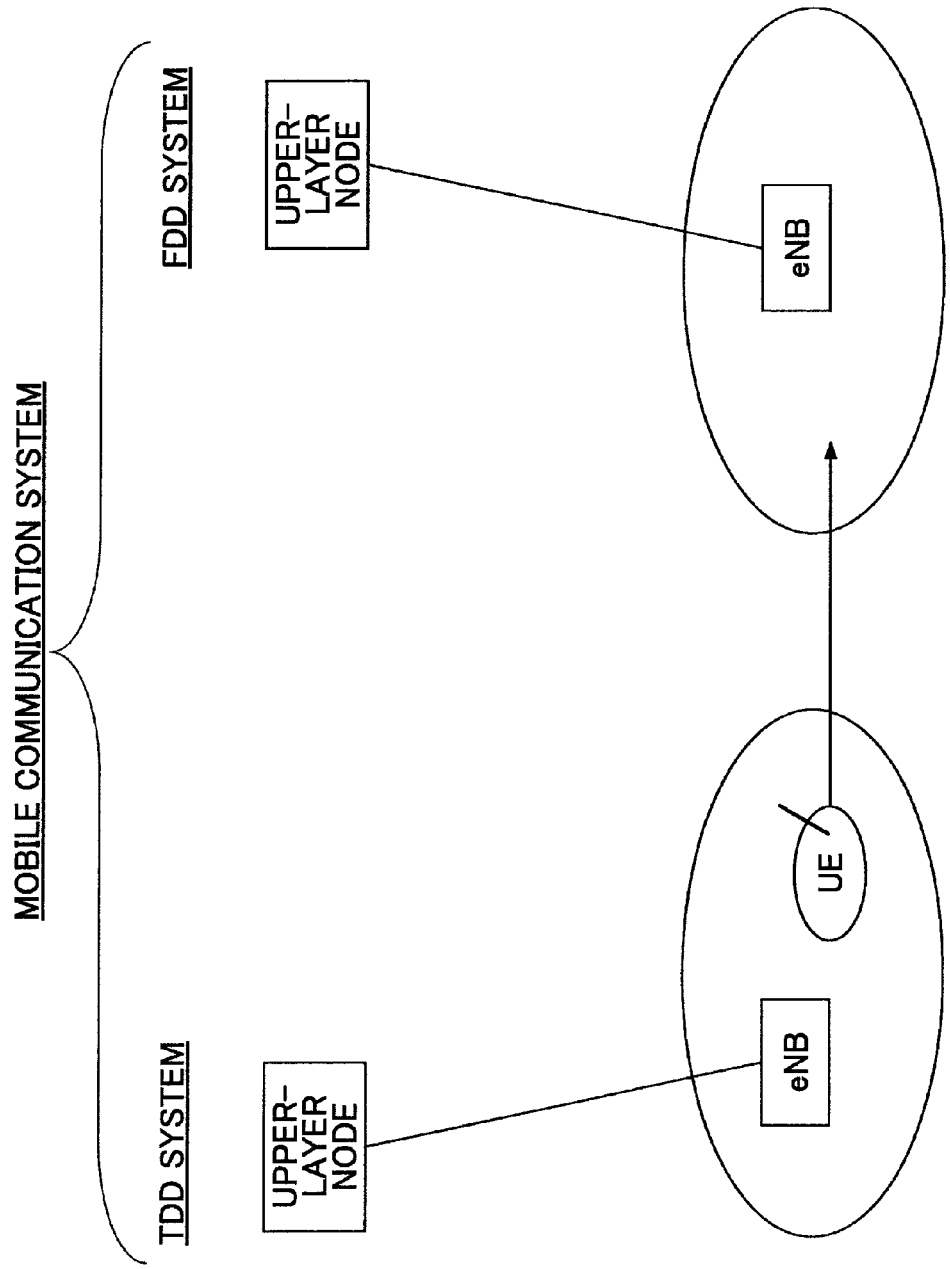
FIG. 1 illustrates a mobile communications system.

UE user apparatus; eNB base station apparatus; D1 initial packet; D2, D3, . . . retransmission packet; 61 encoder/modulator; 62 transmit buffer; 63 radio unit; 64 control information processor; 65 transmission timing controller; 208 base band signal processor; 210 radio resource controller; 2081 layer 1 processor; 2082 MAC processor; 2083 RLC processor

BEST MODE OF CARRYING OUT THE INVENTION

According to one embodiment of the present invention, a user apparatus is used. The user apparatus includes a unit which determines, using acknowledgement information received from a communications counterpart, whether retransmission is required for a transmitted signal; and a unit which transmits, to the communications counterpart, a signal required to be retransmitted according to a round-trip delay (RTD) which is set in the user apparatus for retransmission control. The RTD of the user apparatus is changed, when the user apparatus enters a region which uses an RTD shorter than an RTD set for the user apparatus, to an integer multiple of the shorter RTD.

The user apparatus may conduct half-duplex communications using a time-division duplexing scheme.

The user apparatus may be used in the mobile communications system using frequency division duplexing by alternately changing a tuning frequency depending on whether it is uplink or downlink.

The integer multiple of the shorter RTD becomes no less than an RTD which is preset for retransmission control.

The RTD which is preset is 10 TTIs, and the RTD of the user apparatus may be changed to 12 TTIs when the user apparatus enters a region which uses the RTD of 6 TTIs.

According to one embodiment of the present invention, a base station apparatus is used. The base station apparatus includes a unit which determines whether retransmission is required for a signal received from a user apparatus; a unit which, when the retransmission from the user apparatus is required, allocates a radio resource to the user apparatus such that the user apparatus may conduct retransmission according to a round trip delay (RTD) which is set for the user apparatus; and a unit which receives a retransmission signal from the user apparatus using a radio resource reported to the user apparatus. If the RTD which has been set to the user apparatus prior to the user apparatus entering a region of the mobile communications system is longer than a system RTD for use in the mobile communications system, a radio resource is allocated to the user apparatus such that the user apparatus retransmits a signal with an RTD which is an integer multiple of the system RTD.

According to one embodiment of the present invention, a method in a user apparatus in a mobile communications system is used. The present method includes the steps of determining, using acknowledgement information received from a communications counterpart, whether retransmission is required for a transmitted signal; transmitting, to the communications counterpart, a signal required to be retransmitted according to a round-trip delay (RTD) which is set in the user apparatus for retransmission control. The RTD of the user apparatus is changed, when the user apparatus enters a region which uses an RTD shorter than an RTD set for the user apparatus, to an integer multiple of the shorter RTD.

According to one embodiment of the present invention, a method in a base station apparatus in a mobile communications system is used. The present method includes the steps of determining whether retransmission is required for a signal received from a user apparatus; when the retransmission from the user apparatus is required, allocating a radio resource to the user apparatus such that the user apparatus may conduct retransmission according to a round trip delay (RTD) which is set for the user apparatus; and receiving a retransmission signal from the user apparatus using a radio resource assigned to the user apparatus. If the RTD which has been set in the user apparatus prior to the user apparatus entering a region of the mobile communications system is longer than a system RTD for use in the mobile communications system, a radio resource is allocated to the user apparatus such that the user apparatus retransmits a signal with an RTD which is an integer multiple of the system RTD.

While specific numerical value examples are used to facilitate understanding of the present invention, such numerical values are merely examples, so that any appropriate value may be used unless specified otherwise.

Embodiment 1

System

FIG. 1 shows a mobile communications system for use in one embodiment of the present invention. As illustrated, a TDD system and an FDD system coexist in a mobile communications system. In the mobile communications system, a user apparatus UE can communicate with a communications counterpart via radio communications with a base station apparatus eNB. The base station apparatus is connected to an upper-layer node such as an access gateway apparatus, etc., which upper-layer node is connected to a core network (not shown). The user apparatus performs a handover or roaming between cells or sectors, allowing a mobile communications service to be used within a service area.

As an example, while it is assumed that the TDD and FDD systems are Evolved UTRA or long term evolution (LTE) systems, the present invention is not limited to the LTE system. The LTE system is a communications system to succeed a wideband-code division multiple access (W-CDMA) system, a high-speed downlink packet access (HSDPA) system, a high-speed uplink packet access (HSUPA) system, etc. The LTE system uses orthogonal frequency division multiplexing (OFDM) for downlink and single-carrier frequency division multiple access (SC-FDMA) for uplink.

The LTE system allocates one or more resource blocks to a mobile station (more generally, a user equipment (UE) unit which includes a mobile station and a fixed station) in both downlink and uplink. The resource blocks are shared by a large number of mobile stations within a system. In the LTE, the base station determines which mobile station of multiple mobile stations a resource block is allocated to for each sub-frame, which is 1 ms. The sub-frame may be called a transmission time interval (TTI). This process is called scheduling. In downlink, the base station transmits a shared channel in one or more resource blocks to a mobile station selected in the scheduling. The shared channel is called a physical downlink shared channel (PDSCH). In uplink, the mobile station selected in the scheduling transmits a shared channel in one or more resource blocks to the base station. The shared channel is called a physical uplink shared channel (PUSCH).

In a communications system using these shared channels, it is necessary to signal, for each sub-frame, which user apparatus the shared channel is allocated to. In the LTE, a control channel used in this signaling is called a physical downlink control channel (PDCCH) or a downlink (DL) L1/L2 control channel. The physical downlink control channel PDCCH may include downlink scheduling information, acknowledgement information (ACK/NACK), an uplink scheduling grant, an overload indicator, a transmission power control (TPC) command bit, etc., for example. The contents of the acknowledgement information are expressed as ACK (acknowledgement), which indicates that a transmit signal has been properly received or NACK (negative acknowledgement), which indicates that it has not been received properly.

The control channel for the uplink is transmitted in a resource allocated to the PUSCH when the uplink physical shared channel (PUSCH) is transmitted and is otherwise transmitted in a control channel-dedicated resource. The former includes uplink scheduling information used in the PUSCH. The latter is called an uplink physical control channel (PUCCH). In the uplink control channel, a downlink channel quality indicator (CQI) and physical downlink shared channel transmission acknowledgement information (ACK/NACK), etc., are transmitted. The CQI is used for a physical downlink shared channel scheduling process, adaptive modulation/demodulation and encoding scheme (AMCS), etc.

Exemplary Frame Configuration

Figure 2:
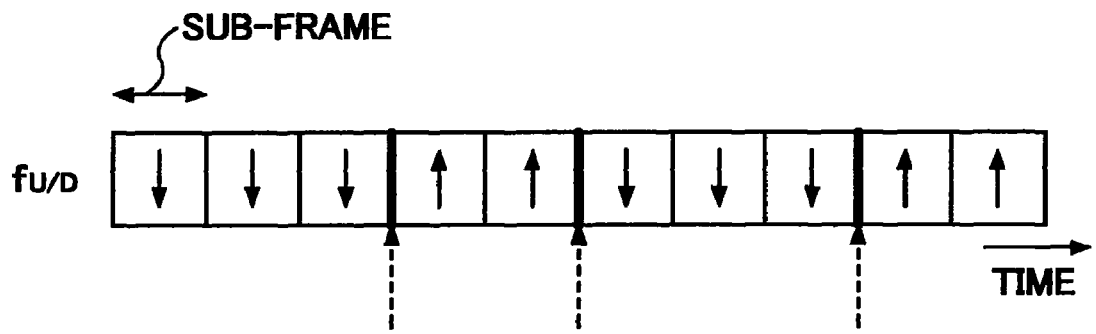
FIG. 2 is a diagram illustrating an exemplary frame configuration in a TDD system.

FIG. 2 shows an exemplary frame configuration used in a TDD system. The TDD, which uses the same frequency fU/D for uplink and downlink, has uplink and downlink periods alternating. The timing of changing between uplink and downlink is shown in a wavy line arrow. In the example shown, three sub-frames are allocated to downlink and two sub-frames are allocated to uplink; these numerical figures are merely exemplary, so that any appropriate numerical value may be used.

Figure 3:
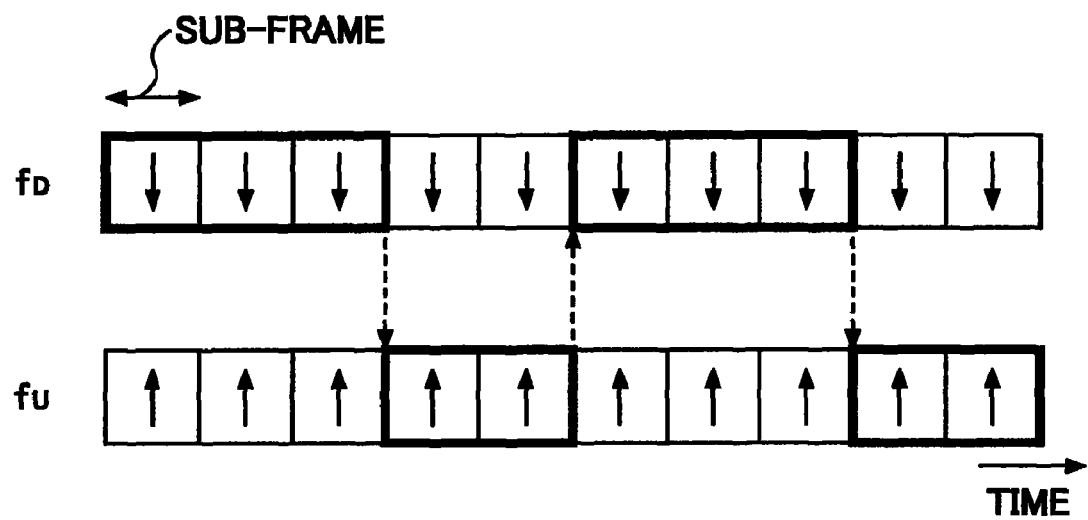
FIG. 3 is a diagram illustrating an exemplary frame configuration in an FDD system.

FIG. 3 shows an exemplary frame configuration used in an FDD system. The FDD system provides for separate frequency bands for uplink and for downlink. In the example shown, the downlink frequency is shown as fD, while the uplink frequency is shown as fU. In the FDD system, uplink and downlink communications are conducted independently from each other. Therefore, uplink and downlink signals may be transmitted simultaneously.

As described above, to arrange for the TDD terminal to be able to operate at low cost in the FDD system means to arrange for the TDD terminal to change a tuning frequency. For example, suppose a TDD terminal which operates in a frame configuration in FIG. 2 enters an FDD system of a frame configuration of FIG. 3. In this case, it is arranged for the terminal to change the tuning frequency in a timing shown in the wavy line arrow in FIG. 3. This makes it possible for the TDD terminal to be continually used even among the FDD terminals.

Exemplary Operation

As described above, a round trip delay (RTD) for retransmission control in the FDD system tends to be set shorter than the RTD in the TDD system. Conversely, the RTD in the TDD system tends to be set longer than the RTD in the FDD system. As an example, while the RTD of the TDD system is set to be 6 TTIs and the RTD of the FDD system is set to be 10 TTIs, another numerical value may be used. At any rate, a retransmission packet is transmitted within an RTD elapsed time after a packet is transmitted. Thus, a source of a packet receives transmission acknowledgement information within an RTD period, confirms the contents (ACK/NACK), and creates a retransmission packet in case of NACK.

Figure 4:
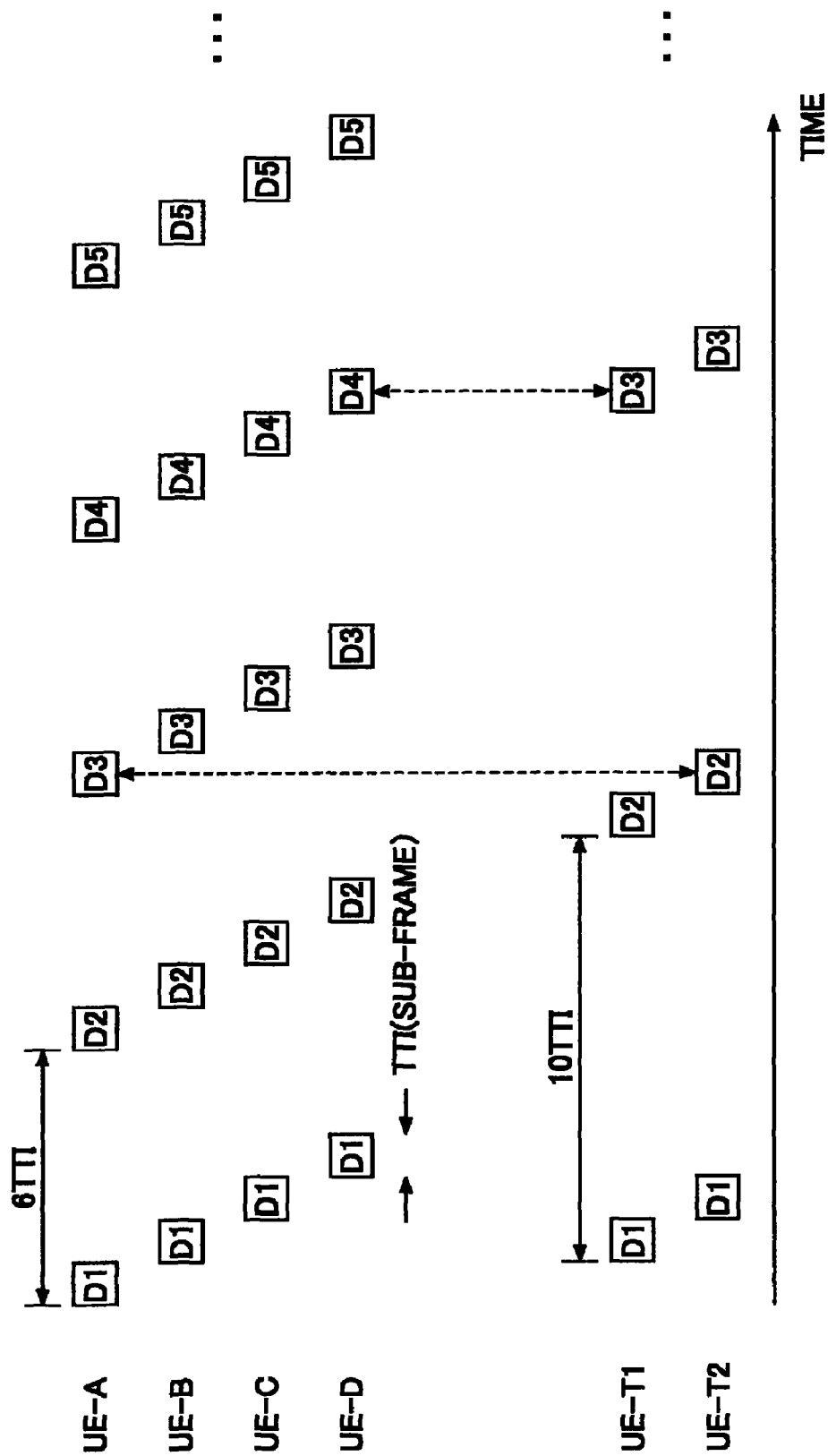
FIG. 4 is a view showing an exemplary operation when the present invention is not utilized.

In an example shown in FIG. 4, user apparatuses UE-A, UE-B, UE-C, and UE-D are retransmitting every 6 TTIs in an FDD system. In FIG. 4, D1 represents an initial packet, while D2 and D3 show retransmission packets. While the same letter is used for any user, it is not necessarily the case that each user transmits the same data. Numbers represented as D1, D2, D3 merely indicate that they correspond to numbers of times of retransmission. Moreover, all users retransmit a number of times, once every 6 TTIs, which merely envisages a worst case (a case in which radio propagation condition is so poor that each user requires a large number of retransmissions) for convenience of explanation. In practice, a maximum number of times of retransmission is set, so that further retransmissions are not performed.

Suppose TDD terminals UE-T1 and UE-T2 enter an FDD system with the RTD of 6 TTIs, where the RTD in a TDD system to which the TDD terminals had belonged is 10 TTIs. The TDD terminal is able to conduct TDD communications by conducting half-duplex communications in the FDD system. In this case, suppose the RTD of the TDD terminals UE-T1 and UE-T2 remains as 10 TTIs. In the example shown, it is supposed that the UE-T1 rather than UE-B transmits a retransmission packet every TTIs. In this case, it is anticipated that the retransmission packet D3 of the TDD terminal UE-T1 and the retransmission packet D4 of the UE-D could collide. Assuming that the UE-T2, instead of the UE-C, transmits a retransmission packet every 10 TTIs, it is anticipated that the retransmission packet D2 of the UE-T2 and the retransmission packet D3 of the UE-A could collide. Thus, in order to prevent such a collision from occurring, the base station apparatus has to appropriately take into account allocation of radio resources. Taking into account in scheduling, depending on a number of times of retransmissions, whether a collision may occur as described above is not easy, leading to a concern that a processing burden of the base station apparatus may become heavy. Moreover, providing all TDD terminals with high operating process capabilities so that the TDD terminals can follow even the RTD of 6 TTIs as described above is not easy, and cannot be implemented at low cost.

Figure 5:
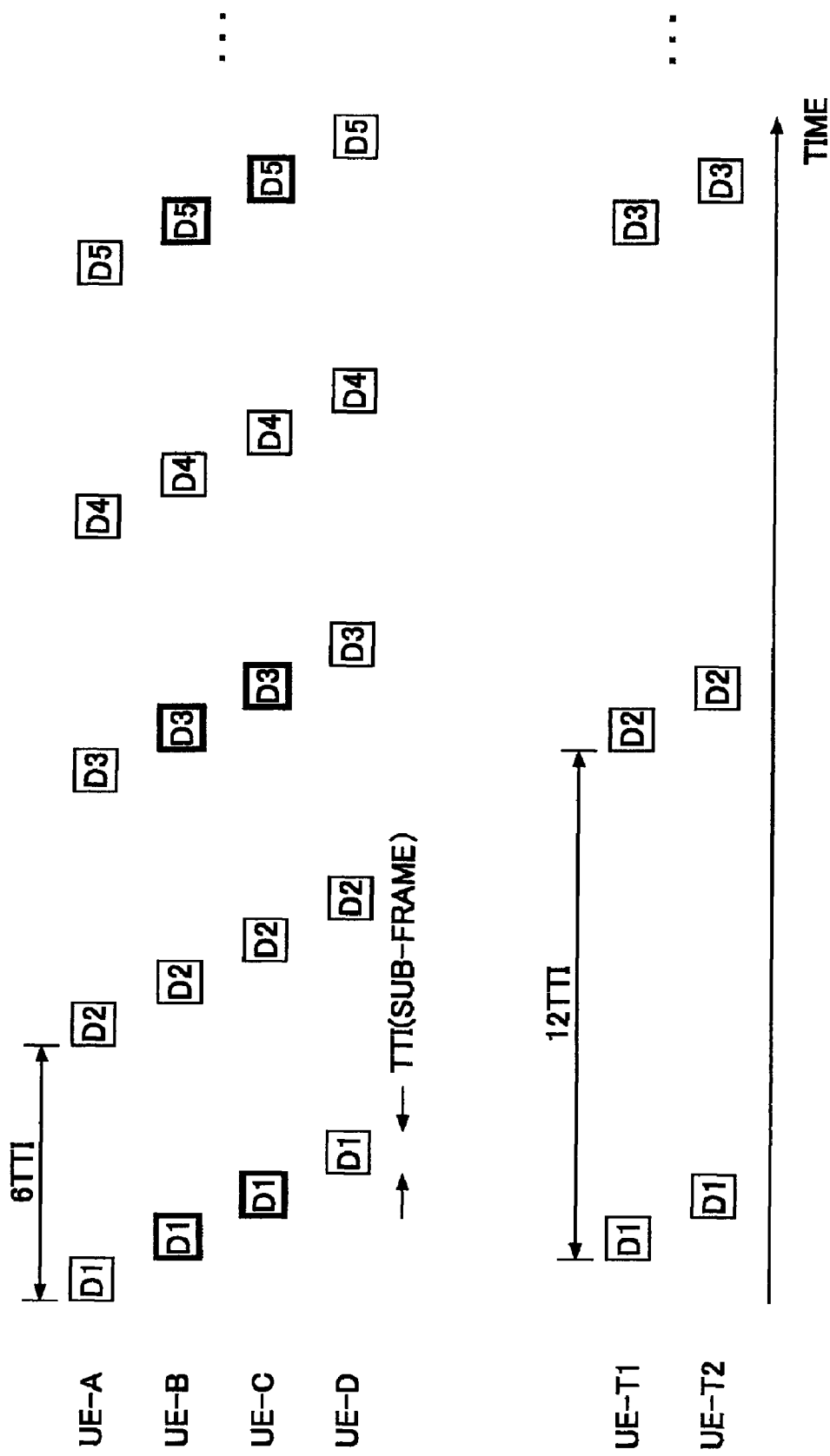
FIG. 5 is a diagram illustrating an exemplary operation according to an embodiment of the present invention.

FIG. 5 shows an exemplary operation according to an embodiment of the present invention. The letters and numbers shown in FIG. 5 are the same as those in FIG. 4. Unlike the example shown in FIG. 4, the TDD terminals UE-T1 and UE-T2, which have roamed into the FDD system, transmit a retransmission packet every 12 TTIs. Suppose that, instead of the UE-B, the UE-T1 retransmits every 12 TTIs. In this case, the TDD terminal UE-T1 ends up not colliding with any user apparatus retransmission packet. This is because the UE-B and UE-A, C, D retransmission timings did not collide, and the UE-T1 retransmission timing matches the UE-B D1, D3, D5, . . . retransmission timings. Similarly, suppose that, instead of the UE-C, the UE-T2 retransmits every 12 TTIs. In this case, the TDD terminal UE-T2 also ends up not colliding with any user apparatus retransmission packet. This is because the UE-C and UE-A, B, D retransmission timings did not collide, and the UE-T2 retransmission timing matches the UE-C D1, D3, D5, . . . retransmission timings. In the present embodiment, the TDD terminal which has roamed into the FDD system with the RTD=6 TTIs conducts half-duplex communications in the FDD system, sets an own apparatus RTD at 6×2=12 TTIs, and retransmits every 12 TTIs when retransmission is needed. The RTD for retransmission control may be changed (from 10 TTIs to 6 TTIs) when the TDD terminal is registered with the FDD system or when the TDD terminal sets up a connection within the FDD system. (It may be changed at some other timing.)

The TDD terminals UE-T1 and UE-T2 can be operated with the RTD=10 TTIs, so that setting the RTD longer can be realized in a relatively easy manner. This is because the transmission waiting time of the retransmission packet merely becomes long. The present invention makes it possible for a user apparatus to be continually operated easily and at low cost even when the user apparatus enters an area using an RTD shorter than an RTD being set for the user apparatus.

User Apparatus

Figure 6:
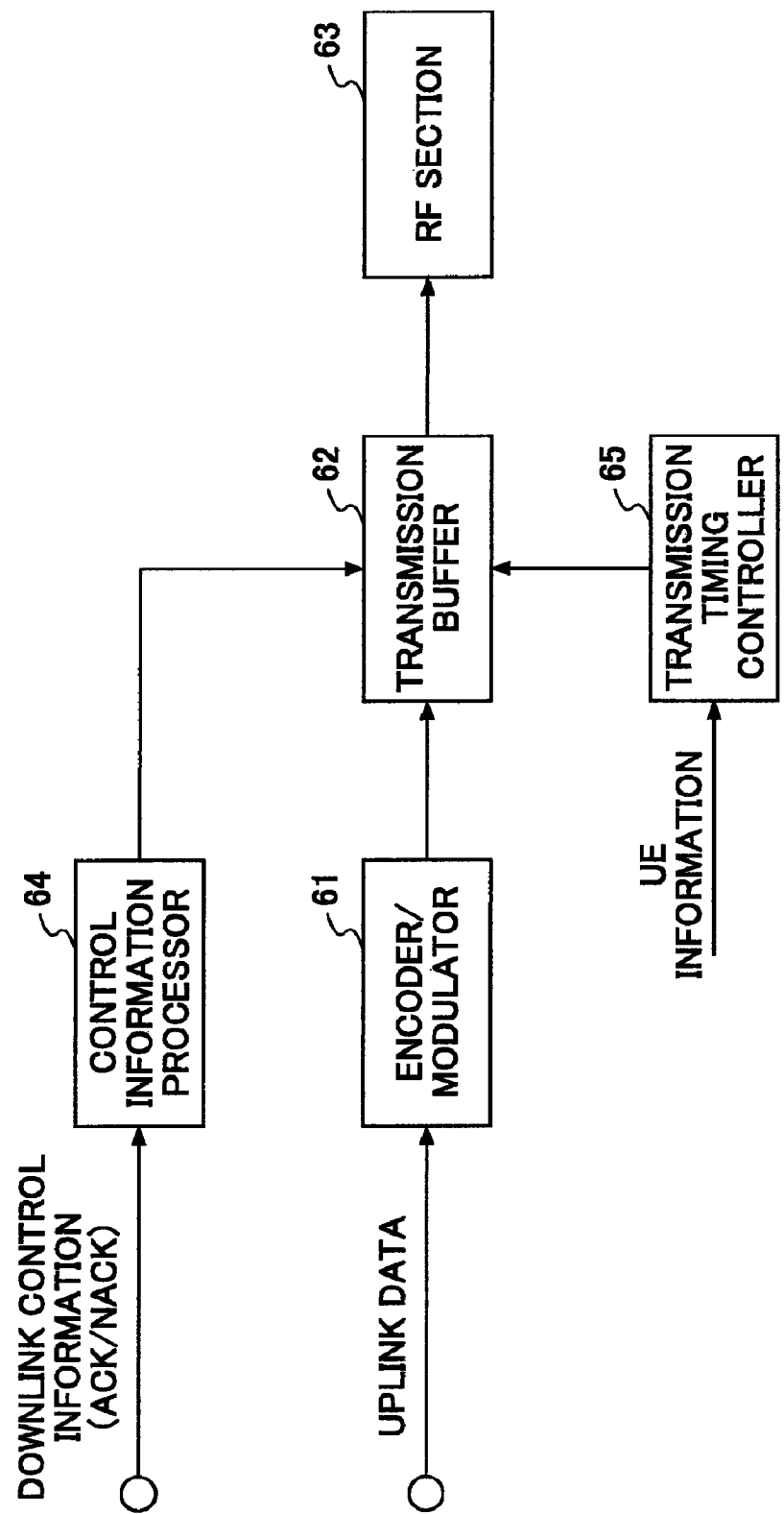
FIG. 6 is a partial block diagram of a user apparatus used in an embodiment of the present invention.

FIG. 6 shows a user apparatus for use in one embodiment of the present invention. FIG. 6 illustrates an encoder/modulator 61, a transmit buffer 62, a radio unit 63, a control information processor 64, and a transmission timing controller 65.

The encoder/modulator 61 converts uplink data (data to be a physical uplink shared data channel PUSCH) to a transmit symbol. The encoder/modulator 61 performs processes such as channel encoding, data modulation, discrete Fourier transform processing (DFT), sub-carrier mapping, inverse fast Fourier transform processing (IFFT), etc.

For brevity and clarity of illustration, while process blocks on control channels are not drawn, signal processing is also performed for a control channel, so that it may be transmitted in the PUSCH or in the PUCCH.

The transmit buffer 62 hold a transmit symbol until a transmission timing arrives. The transmit symbol to be held includes not only a transmit symbol to be transmitted for a first time, but also a previously transmitted transmit symbol. The latter is used when retransmission is required.

The radio unit (RF unit) 63 performs processes for converting the transmit symbol into a radio frequency signal. Such processes include frequency conversion, bandwidth limiting, power amplification, etc.

The control information processor 64 analyzes control information included in a downlink control channel. The downlink control channel is typically a downlink L1/L2 control channel. In the present embodiment, it is determined whether acknowledgement information for previously transmitted data channel PUSCH indicates a positive response ACK or a negative response NACK. The determined result is reported to the transmit buffer 62. The negative response NACK requires retransmission, so that previously transmitted data are provided in the transmit buffer 62 in preparation for retransmission. The positive response ACK leads to untransmitted data being provided in the transmit buffer 62 such that the untransmitted data are transmitted as an initial packet. The downlink L1/L2 control channel includes uplink scheduling information, based on which information a resource to be used in the PUSCH is specified.

The transmission timing controller 65 assigns to the transmit buffer not only a timing at which data are to be output from the transmit buffer but also a radio transmission timing. A radio resource used for uplink data transmission is determined based on uplink scheduling information, but a round trip delay (RTD) of a retransmission packet is set in the system on a fixed basis. In the above exemplary operation, the FDD terminal is set at RTD=6 TTIs. The RTD had been set equal to 10 TTIs when the TDD terminal visited the TDD system, but the RTD had been changed to 6 TTIs when the TDD terminal roamed to the FDD system. The transmission timing controller 65 manages such setting of the RTD. A timing of changing the RTD may be when the TDD terminal registers with the FDD system or when the TDD terminal sets up a connection with the FDD system, or at any other appropriate timing.

Base Station Apparatus

FIG. 7 shows a base band signal processor of a base station apparatus according to an embodiment of the present invention. FIG. 7 shows a base band signal processor 208, a radio resource controller 210, a layer 1 processor 2081, an MAC processor 2082, and an RLC processor 2083.

The radio resource controller 210 performs processes, including call processes such as a communications channel setting, releasing, etc., status management of the base station apparatus, management of a radio resource, etc.

The layer 1 processor 2081 performs processes such as channel encoding, data modulation, inverse fast Fourier (IFFT) transform, etc., on downlink data. The layer 1 processor 2081 performs processes such as a fast Fourier transform (FFT) process, data demodulation, channel decoding, etc., on data received in uplink. The channel encoding rate and the data modulating, etc., are performed according to a report from the MAC processor 2082.

On the downlink data, the MAC processor 2082 performs processes such as a transmission process of MAC retransmission control (HARQ), scheduling processes (resource block allocation, etc.), transmission format selection, and data size (or channel encoding rate) selection, etc. On the uplink data, the MAC processor 2082 performs processes such as a reception process of MAC retransmission control (HARQ), a scheduling process (resource block allocation), transmission format selection, and data size (or channel encoding rate, etc.) selection. Retransmission for each constant period that is described in the above exemplary operation is primarily controlled at the MAC processor.

On the downlink data, the RLC processor 2083 performs a transmission process of retransmission control in an RLC layer, and segmentation and/or concatenation of data in alignment with a predetermined block size. On the uplink data, the RLC processor 2083 performs a reception process of retransmission control in the RLC layer, and segmentation and/or concatenation of data in alignment with the predetermined block size.

While the present invention has been described above using, as an example, a specific system such as an LTE system, any other appropriate system may be applied to the present invention.

For convenience of explanation, a case has been described of transmitting, by the user apparatus, a retransmission packet (in other words, retransmission control in uplink); the present invention can be applied widely to a case in which retransmission packets are transmitted at a certain RTD.

While the RTD is changed from 10 TTIs to 12 TTIs (=2×6 TTIs), more generally, it suffices for the following relational expression to apply.

$$(\text{RTD before change}) < (\text{RTD after change}) = N \times (\text{RTD of system to transfer to})$$

Here, N is an integer no less than 2. In the above example, the RTD before the change is 10 TTIs, the RTD after the change is 12 TTIs, N is 2, and the RTD of the system to transfer to is 6 TTIs. Therefore, theoretically, N may be 3 or 4. However, from the point of view of shortening the RTD as much as possible, N should be set to be a value which is lowest of all Ns that satisfy the above described relationship.

In the above description, while an example is described for a case such that the TDD terminal roamed into the FDD system, the present invention may be extended to a case of merely increasing an RTD which has been already set for the terminal. When the present invention is applied for a case of the TDD terminal roaming into the FDD system, it is particularly advantageous in that the TDD terminal may continually be used easily and at a low cost even within the FDD system. If the present invention is not used, there is a concern that the TDD terminal may be required to be of performance which is high for it to be able to operate even when RTD=6 TTIs, or the resource allocation process, etc., of the base station apparatus may become complicated in order for the TDD terminal to be able to operate at RTD=10 TTIs.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. A breakdown of embodiments or items is not essential to the present invention, so that matters described in two or more embodiments or items may be used in combination as needed, or matters described in a certain embodiment or item may be applied to matters described in a different embodiment or item as long as they do not contradict. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2007-286740 filed on Nov. 2, 2007, the entire contents of which are hereby incorporated by reference.

The invention claimed is:

1. A user apparatus for use in a mobile communications system, comprising:
a unit which determines, using acknowledgement information received from a communications counterpart, whether retransmission is required for a transmitted signal; and
a unit which transmits, to the communications counterpart, a signal required to be retransmitted according to a round-trip delay (RTD) which is set in the user apparatus for retransmission control, wherein, the RTD of the user apparatus is arranged to be changed, when the user apparatus enters a region which uses an RTD shorter than the RTD set for the user apparatus, to an integer multiple of the shorter RTD,
wherein the integer multiple of the shorter RTD becomes no less than an RTD which is preset for retransmission control,
wherein the shorter RTD is six times a transmission time interval (TTI), and
wherein the RTD which is preset is 10 TTIs, and the RTD of the user apparatus is changed to 12 TTIs when the user apparatus enters a region which uses the RTD of 6 TTIs.

2. The user apparatus as claimed in claim 1, wherein the user apparatus conducts half-duplex communications using a time-division duplexing scheme.

3. The user apparatus as claimed in claim 2, wherein the user apparatus is used in the mobile communications system using frequency division duplexing by alternately changing a tuning frequency depending on whether it is uplink or downlink.

4. A base station apparatus for use in a mobile communications system, comprising:
a unit which determines whether retransmission is required for a signal received from a user apparatus;
a unit which, when the retransmission from the user apparatus is required, allocates a radio resource to the user apparatus such that the user apparatus may conduct retransmission according to a round trip delay (RTD) which is set for the user apparatus; and
a unit which receives a retransmission signal from the user apparatus using a radio resource reported to the user apparatus, wherein, if the RTD which had been set for the user apparatus prior to the user apparatus entering a region of the mobile communications system is longer than a system RTD for use in the mobile communications system, a radio resource is allocated to the user apparatus such that the user apparatus retransmits a signal with an RTD which is an integer multiple of the system RTD,
wherein the system RTD is six times a transmission time interval (TTI), and
wherein the RTD which had been set for the user apparatus prior to the user apparatus entering the region of the mobile communications system is 10 TTIs, and a radio resource is allocated to the user apparatus so that the user apparatus retransmits a signal with 12 RTDs.

5. The base station apparatus as claimed in claim 4, wherein the integer multiple of the system RTD becomes no less than the RTD which had been set for the user apparatus.

6. A mobile communications system having a base station apparatus and a user apparatus,
wherein the base station apparatus includes
a unit which determines whether retransmission is required for a signal received from the user apparatus; and
a unit which, when the retransmission from the user apparatus is required, allocates a radio resource to the user apparatus such that the user apparatus may conduct retransmission according to a round trip delay (RTD) which is set for the user apparatus,
wherein the system RTD is six times a transmission time interval (TTI), and
wherein the RTD which had been set for the user apparatus prior to the user apparatus entering the region of the mobile communications system is 10 TTIs, and a radio resource is allocated to the user apparatus so that the user apparatus retransmits a signal with 12 RTDs,
wherein the user apparatus includes
a unit which determines, using acknowledgement information received from the base station apparatus, whether retransmission is required for a transmitted signal; and
a unit which transmits, to the base station apparatus, a signal required for retransmission according to an RTD which is set for retransmission control,
wherein, if the RTD which had been set for the user apparatus prior to the user apparatus entering a region of the mobile communications system is longer than a system RTD for use in the mobile communications system, an RTD of the user apparatus is set to an integer multiple of the system RTD and a radio resource is allocated to the user apparatus such that the user apparatus retransmits a signal with an RTD which is the integer multiple of the system RTD,
wherein the integer multiple of the shorter RTD becomes no less than an RTD which is preset for retransmission control, wherein the shorter RTD is six times a transmission time interval (TTI), and wherein the RTD which is preset is 10 TTIs, and the RTD of the user apparatus is changed to 12 TTIs when the user apparatus enters a region which uses the RTD of 6 TTIs.

7. A method for use in a user apparatus in a mobile communications system, comprising the steps of:

determining, using acknowledgement information received from a communications counterpart, whether retransmission is required for a transmitted signal;

transmitting, to the communications counterpart, a signal required to be retransmitted according to a round-trip delay (RTD) which is set in the user apparatus for retransmission control, wherein, the RTD of the user apparatus is arranged to be changed, when the user apparatus enters a region which uses an RTD shorter than the RTD set for the user apparatus, to an integer multiple of the shorter RTD, wherein the integer multiple of the shorter RTD becomes no less than an RTD which is preset for retransmission control, wherein the shorter RTD is six times a transmission time interval (TTI), and wherein the RTD which is preset is 10 TTIs, and the RTD of the user apparatus is changed to 12 TTIs when the user apparatus enters a region which uses the RTD of 6 TTIs.

8. A method for use in a base station apparatus in a mobile communications system, comprising the steps of:

determining whether retransmission is required for a signal received from a user apparatus;

when the retransmission from the user apparatus is required, allocating a radio resource to the user apparatus such that the user apparatus may conduct retransmission according to a round trip delay (RTD) which is set for the user apparatus; and receiving a retransmission signal from the user apparatus using a radio resource assigned to the user apparatus, wherein, if the RTD which had been set for the user apparatus prior to the user apparatus entering a region of the mobile communications system is longer than a system RTD for use in the mobile communications system, a radio resource is allocated to the user apparatus such that the user apparatus retransmits a signal with an RTD which is an integer multiple of the system RTD, wherein the system RTD is six times a transmission time interval (TTI), and wherein the RTD which had been set for the user apparatus prior to the user apparatus entering the region of the mobile communications system is 10 TTIs, and a radio resource is allocated to the user apparatus so that the user apparatus retransmits a signal with 12 RTDs.

* * * * *